US010371926B2

(12) United States Patent
Shi et al.

(10) Patent No.: US 10,371,926 B2
(45) Date of Patent: Aug. 6, 2019

(54) CAMERA LENS

(71) Applicants: Rongbao Shi, Shenzhen (CN); Hiroyuki Teraoka, Shenzhen (CN)

(72) Inventors: Rongbao Shi, Shenzhen (CN); Hiroyuki Teraoka, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/230,611

(22) Filed: Aug. 8, 2016

(65) Prior Publication Data

US 2017/0293109 A1 Oct. 12, 2017

(30) Foreign Application Priority Data

Apr. 8, 2016 (JP) ................................ 2016-077896
Apr. 30, 2016 (CN) ......................... 2016 1 0281630

(51) Int. Cl.

| | |
|---|---|
| ***G02B 3/02*** | (2006.01) |
| ***G02B 13/18*** | (2006.01) |
| ***G02B 13/00*** | (2006.01) |
| ***G02B 9/34*** | (2006.01) |
| ***G02B 27/00*** | (2006.01) |

(52) U.S. Cl.
CPC ............ *G02B 13/004* (2013.01); *G02B 9/34* (2013.01); *G02B 27/0025* (2013.01)

(58) Field of Classification Search
CPC ............................... G02B 13/004; G02B 9/34
USPC ................................................ 359/642–830
See application file for complete search history.

(56) References Cited

U.S. PATENT DOCUMENTS

2015/0370039 A1* 12/2015 Bone .................... G02B 13/004 359/715
2016/0187619 A1* 6/2016 Tang .................. G02B 13/0045 359/713

* cited by examiner

*Primary Examiner* — Mahidere S Sahle
(74) *Attorney, Agent, or Firm* — Na Xu; IPro, PLLC

(57) ABSTRACT

A camera lens is disclosed. The camera lens includes: a first lens with positive refractive power; a second lens with negative refractive power; a third lens with positive refractive power; a fourth lens with negative refractive power, which are arranged sequentially from an object side. The camera lens is characterized in that it satisfies specified conditions.

4 Claims, 5 Drawing Sheets

CAMERA LENS

FIELD OF THE INVENTION

The present invention relates to a camera lens, and more particularly to a camera lens very suitable for mobile phone camera module and WEB camera lens etc. equipped with high-pixel camera elements such as CCD, CMOS etc.

DESCRIPTION OF RELATED ART

In recent years, various camera devices equipped with camera elements such as CCD, CMOS are extensively popular. Along with development on camera lens toward miniaturization and high performance, ultra-thin and high-luminous flux (Fno) wide angle camera lenses with excellent optical properties are needed.

The technology related to the camera lens composed of four piece small sized and high-luminous flux (Fno) wide angle lenses with excellent optical properties is developed gradually. The camera lens mentioned in the proposal is composed of four piece lenses which are arranged sequentially from object side as follows: a first lens with positive refractive power; a second lens with negative refractive power; a third lens with positive refractive power; a fourth lens with negative refractive power.

The camera lens disclosed in embodiments of Prior Reference Document 1 is composed of the above mentioned four lenses, but refractive power distribution of the first lens and the fourth lens is insufficient and shape of the first lens and is improper; so Fno≥2.30 brightness is insufficient.

The camera lens disclosed in embodiments of Prior Reference Document 2 is composed of the above mentioned four lenses, but refractive power distribution of the first lens and the fourth lens is insufficient and shape of the first lens and is improper; so Fno≥2.10 brightness is insufficient.

PRIOR REFERENCE DOCUMENTS

[Prior Reference Document 1] Japan Patent Publication No. JP2016-011985;

[Prior Reference Document 2] Japan Patent No. JP5815907.

Therefore, it is necessary to provide a novel camera lens to solve the above-mentioned technical problem.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

Figure 1:
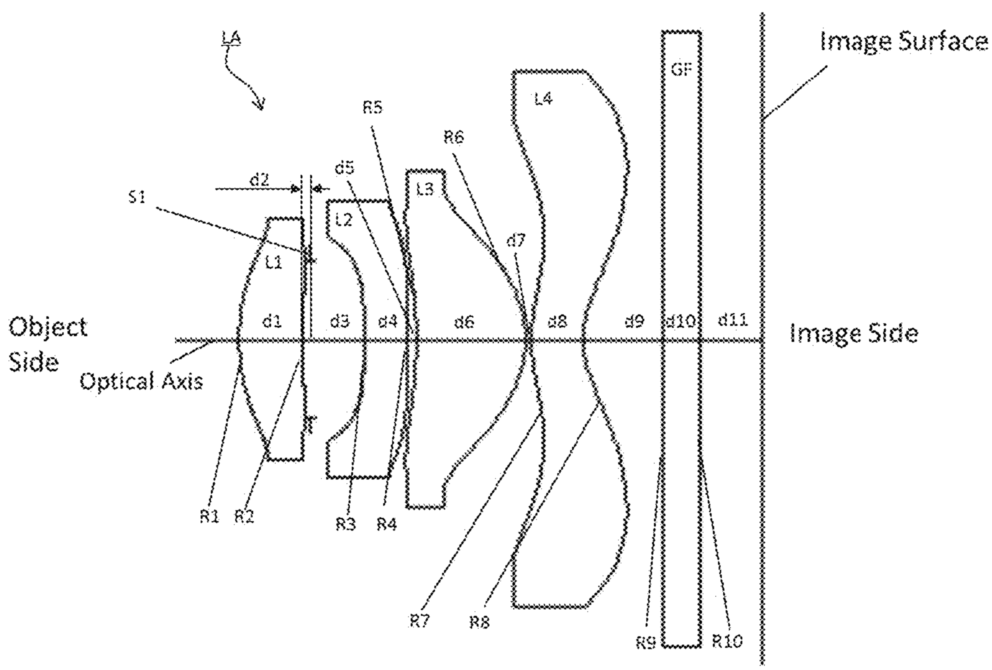
FIG. 1 is an illustrative structure of a camera lens LA of the present disclosure.

The present invention will hereinafter be described in detail with reference to exemplary embodiments. To make the technical problems to be solved, technical solutions and beneficial effects of present disclosure more apparent, the present disclosure is described in further detail together with the figures and the embodiments. It should be understood the specific embodiments described hereby is only to explain this disclosure, not intended to limit this disclosure.

A camera lens LA in accordance with an embodiment of the present disclosure includes, in an order from an object side to an image side, a first lens L1, a second lens L2, a third lens L3, a fourth lens L4. A glass plate GF is arranged between the fourth lens L4 and imaging surface. And a glass cover or an optical filter having the function of filtering IR can be taken as the glass plate GF. Moreover, it shall be OK if no glass plate GF is arranged between the fourth lens L4 and the imaging surface.

The first lens L1 has positive refractive power; the second lens L2 has negative refractive power; the third lens L3 has positive refractive power; the fourth lens L4 has negative refractive power. Moreover, the surfaces of the five lenses should be designed as the spherical shape preferably in order to correct the aberration well.

The camera lens LA satisfies the following conditions (1)~(3):

$$1.25 \le f1/f \le 1.50 \quad (1);$$

$$-2.00 \le f4/f \le -0.90 \quad (2);$$

$$-2.50 \le (R1+R2)/(R1-R2) \le -1.25 \quad (3);$$

Where, f: overall focal distance of the camera lens;

f1: focal distance of the first lens L1;

f4: focal distance of the fourth lens L4;

R1: curvature radius of the first lens L1's object side surface;

R2: curvature radius of the first lens L1's image side surface.

The positive refractive power of the first lens L1 is specified in the condition (1). It is difficult for development of wide angle trend and aberration correction when the numerical range exceeds the lower limit specified in the condition (1) because the positive refractive power of the first lens becomes too strong; on the contrary, when the numerical range exceeds the upper limit specified, the development of ultra-thin trend cannot be implemented easily because positive refractive power of the first lens becomes too weak.

Therefore, numerical range of condition (1) should be set within the numerical range of the following condition (1-A) preferably, $$1.30 \le f1/f \le 1.40 \quad (1\text{-}A)$$

Negative refractive power of the fourth lens L4 is specified in the condition (2). When numerical range exceeds the lower limit specified in condition (2), it is difficult for correction of aberration outside of axle, while numerical range exceeds the upper limit specified, imaging surface can change greatly because of high order aberration or axial core shift of the fourth lens.

Therefore, numerical range of condition (2) should be set within the numerical range of the following condition (2-A) preferably, $$-1.30 \le f4/f \le -1.00 \quad (2\text{-A})$$

The shape of the first lens L1 is specified in the condition (3). The development of miniaturization and wide angle Fno≤2.0 trend cannot be implemented easily outside range of condition (3).

Therefore, numerical range of condition (3) should be set within the numerical range of the following condition (3-A) preferably, $$-2.00 \le (R1+R2)/(R1-R2) \le -1.50 \quad (3\text{-A})$$

The second lens L2 has negative refractive power and satisfies following condition (4).

$$-4.00 \le f2/f \le -2.00 \quad (4);$$

where, f: overall focal distance of the camera lens;

f2: focal distance of the second lens.

Negative refractive power of the second lens is specified in the condition (4). It is difficult for correction of aberration on axle and outside of axle when the numerical range exceeds the lower limit specified in the condition (4) because the negative refractive power of the second lens becomes too weak; on the contrary, when the numerical range exceeds the upper limit specified, negative refractive power of the second lens becomes too strong which causes the result that the aberration cannot be corrected easily, also imaging surface can change greatly because of high order aberration or axial core shift of the second lens.

Therefore, numerical range of condition (4) should be set within the numerical range of the following condition (4-A) preferably, $$-3.20 \le f2/f \le -2.50 \quad (4\text{-A})$$

The third lens L3 has positive refractive power and satisfies the following condition (5).

$$0.40 \le f3/f \le 1.00 \quad (5);$$

where, f: overall focal distance of the camera lens;

f3: focal distance of the third lens.

The positive refractive power of the third lens L3 is specified in condition (5). When the numerical range exceeds the lower limit specified in condition (5), the positive refractive power of the third lens becomes too strong; the imaging surface can change greatly because of high order aberration or axial core shift of the third lens. On the contrary, when the numerical range exceeds the upper limit specified, the development of ultra-thin trend cannot be implemented easily because positive refractive power of the third lens becomes too weak.

Therefore, numerical range of condition (5) should be set within the numerical range of the following condition (5-A) preferably, $$0.65 \le f3/f \le 0.75 \quad (5\text{-A})$$

Because four lenses of camera Lens all have the stated formation and meet all the conditions, so it is possible to produce a camera lens which is composed of four piece small sized wide angle 2θ≥80° and high luminous flux Fno≤2.0 lenses with excellent optical properties.

The camera lens LA of the invention shall be explained below by using the embodiments. Moreover, the symbols used in all embodiments are shown as follows. And mm shall be taken as the units of the distance, the radius and the center thickness.

f: overall focal distance of the camera lens LA f1: focal distance of the first lens L1 f2: focal distance of the second lens L2 f3: focal distance of the third lens L3 f4: focal distance of the fourth lens L4

Fno: F value

2ω: total angle of view

S1: aperture

R: curvature radius of optical surface, central curvature radius when the lens is involved R1: curvature radius of the first lens L1's object side surface R2: curvature radius of the first lens L1's image side surface R3: curvature radius of the second lens L2's object side surface R4: curvature radius of the second lens L2's image side surface R5: curvature radius of the third lens L3's object side surface R6: curvature radius of the third lens L3's image side surface R7: curvature radius of the fourth lens L4's object side surface R8: curvature radius of the fourth lens L4's image side surface R9: curvature radius of the glass plate GF's object side surface R10: curvature radius of the glass plate GF's image side surface d: center thickness of lenses or the distance between lenses d1: center thickness of the first lens L1 d2: axial distance from the image side surface of the first lens L1 to aperture S1 d3: axial distance from aperture S1 to the object side surface of the second lens L2 d4: center thickness of the second lens L2 d5: axial distance from the image side surface of the second lens L2 to the object side surface of the third lens L3 d6: center thickness of the third lens L3 d7: axial distance from the image side surface of the third lens L3 to the object side surface of the fourth lens L4 d8: center thickness of the fourth lens L4 d9: axial distance from the image side surface of the fourth lens L4 to the object side surface of the glass plate GF d10: center thickness of the glass plate GF d11: axial distance from the image side surface to the imaging surface of the glass plate GF nd: refractive power of line d nd1: refractive power of line d of the first lens L1 nd2: refractive power of line d of the second lens L2 nd3: refractive power of line d of the third lens L3 nd4: refractive power of line d of the fourth lens L4 nd5: refractive power of line d of the glass plate GF

νd: abbe number

ν1: abbe number of the first lens L1

ν2: abbe number of the second lens L2

ν3: abbe number of the third lens L3

ν4: abbe number of the fourth lens L4

ν5: abbe number of the glass plate GF

TTL: optical length (axial distance from object side surface to the imaging surface of the first lens L1)

LB: axial distance (including thickness of the glass plate GF) from the image side surface to the imaging surface of the fourth lens L4;

IH: image height $$y=(x2/R)/[1+\{1-(k+1)(x2/R2)\}½]+A4x4+A6x6+A8x8+A10x10+A12x12+A14\ x14+A16x16 \quad (6);$$

wherein R indicates the curvature radius on the axle; k indicates the conical coefficient; and A4, A6, A8, A10, A12, A14 and A16 indicates the coefficients of the aspheric surface.

For convenience sake, the aspheric surface shown in the formula (6) shall be taken as the aspheric surfaces of all lens surfaces. However, the invention shall be not limited to the polynomial form of the aspheric surface shown in the formula (6).

Embodiment 1

Figure 2:
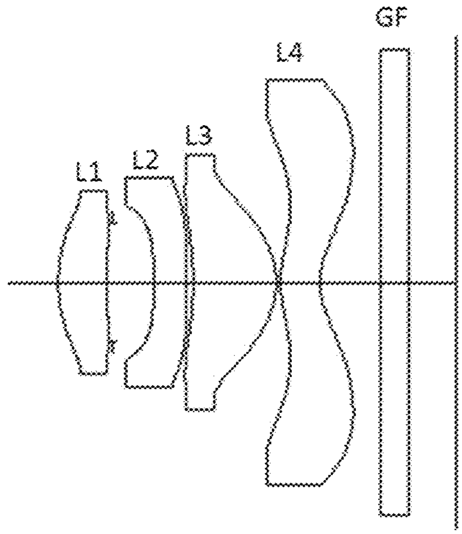
FIG. 2 is an illustrative structure of a camera lens LA in accordance with a first embodiment (Embodiment 1) of the present disclosure.

The configuration structure diagram of the camera lens LA in the Embodiment 1 is shown in the FIG. 2. Moreover, the data including curvature radius R of the object side surfaces and the image side surfaces of L1~L4, center thicknesses of the lenses, the distances d among the lenses, refractive powers nd and abbe numbers νd of the lens L1-L4 in the Embodiment 1 are shown in the Table 1, wherein the camera lens LA is formed by the lens L1~L4; and the data including conical coefficients k and aspheric coefficients are shown in the Table 2.

TABLE 1

| | R | | d | | nd | | ν d |
|---|---|---|---|---|---|---|---|
| R1 | 1.13129 | d1= | 0.360 | n1 | 1.544 | ν 1 | 56.0 |
| R2 | 4.56805 | d2= | 0.036 | | | | |
| S1 | ∞ | d3= | 0.312 | | | | |
| R3 | −5.21754 | d4= | 0.233 | n2 | 1.642 | ν 2 | 22.4 |
| R4 | 13.79373 | d5= | 0.059 | | | | |
| R5 | −1.76600 | d6= | 0.617 | n3 | 1.544 | ν 3 | 56.0 |
| R6 | −0.58982 | d7= | 0.034 | | | | |
| R7 | 0.88849 | d8= | 0.288 | n4 | 1.544 | ν 4 | 56.0 |
| R8 | 0.44172 | d9= | 0.450 | | | | |
| R9 | ∞ | d10= | 0.210 | n5 | 1.517 | ν 5 | 64.2 |
| R10 | ∞ | d11= | 0.357 | | | | |

The values in the embodiments 1 and 2 and the values corresponding to the parameters specified in the conditions (1)-(5) are shown in the subsequent Table 5.

The Embodiment 1 satisfies the conditions (1)-(5), as shown in Table 5.

Figure 3:
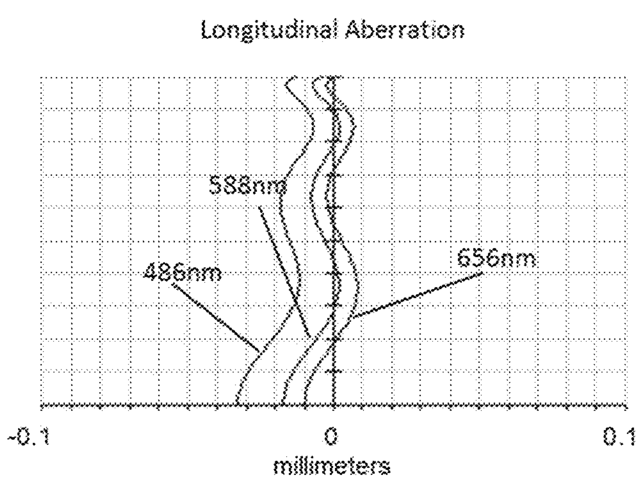
FIG. 3 is a Longitudinal Aberration diagram of the camera lens LA in the Embodiment 1.
Figure 4:
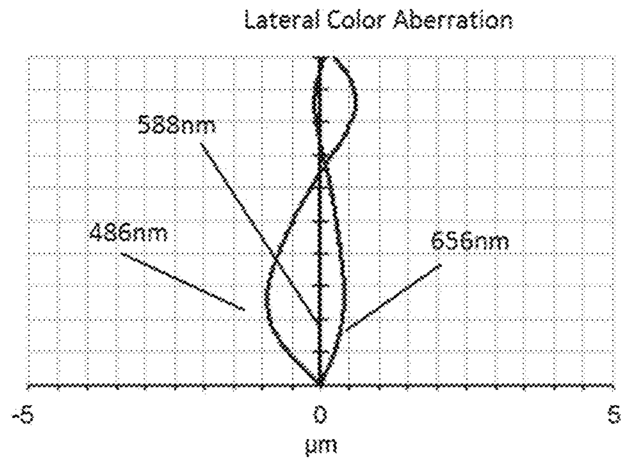
FIG. 4 is a Lateral Color Aberration diagram of the camera lens LA in the Embodiment 1.
Figure 5:
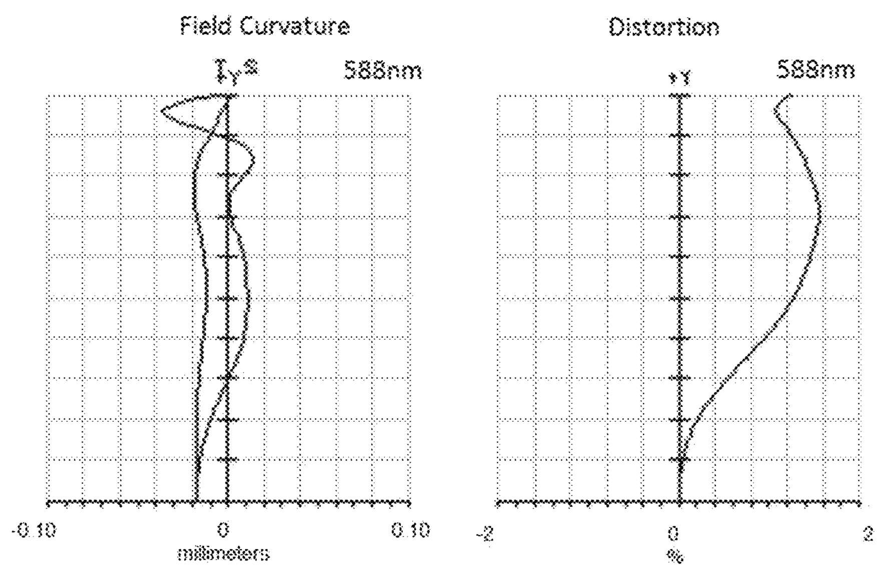
FIG. 5 is a Field Curvature Distortion of the camera lens LA in the Embodiment 1.

See FIG. 3 for Longitudinal Aberration of the camera lens LA in the Embodiment 1, see FIG. 4 for Lateral Color Aberration of it, and see FIG. 5 for curvature of field and distortion of it. Further, the curvature of field S in the FIG. 5 is the one in the sagittal direction, and T is the one in the direction of meridian, as well as in the Embodiment 2. Moreover, the camera lens LA in the embodiment 1 involves small sized wide angle camera lens having high luminous flux as shown in FIGS. 3-5, wherein 2ω=83.5°, TTL/IH=2.956, Fno=1.94; therefore, it is no wonder that this lens has these excellent optical properties.

Embodiment 2

Figure 6:
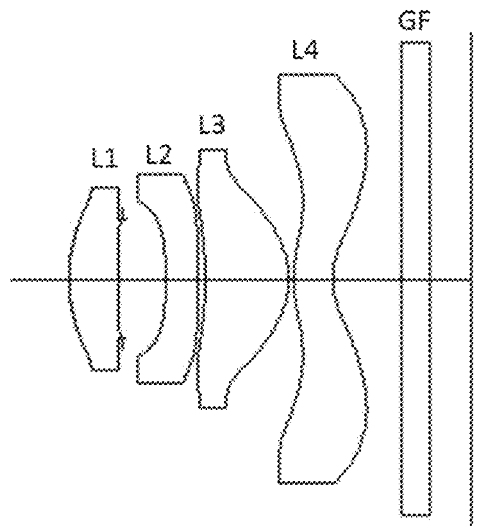
FIG. 6 is an illustrative structure of a camera lens LA in accordance with a second embodiment (Embodiment 2) of the present disclosure.

The configuration structure diagram of the camera lens LA in the Embodiment 2 is shown in the FIG. 6. Moreover, the curvature radius R of the object side surfaces and the image side surfaces, the center thicknesses of the lenses, the distances d among the lenses, the refractive powers nd and abbe numbers νd of the lens L1-L4 in the Embodiment 2 are shown in the Table 3, wherein the camera lens LA is formed by the lens L1-L4; and the conical coefficients k and aspheric coefficients are shown in the Table 4.

TABLE 3

| | R | | d | | nd | | ν d |
|---|---|---|---|---|---|---|---|
| R1 | 1.12199 | d1= | 0.362 | n1 | 1.544 | ν 1 | 56.0 |
| R2 | 4.54876 | d2= | 0.036 | | | | |
| S1 | ∞ | d3= | 0.312 | | | | |
| R3 | −5.12502 | d4= | 0.232 | n2 | 1.642 | ν 2 | 22.4 |
| R4 | 14.04907 | d5= | 0.063 | | | | |
| R5 | −1.74925 | d6= | 0.614 | n3 | 1.544 | ν 3 | 56.0 |
| R6 | −0.58922 | d7= | 0.033 | | | | |
| R7 | 0.88861 | d8= | 0.288 | n4 | 1.544 | ν 4 | 56.0 |
| R8 | 0.44172 | d9= | 0.500 | | | | |
| R9 | ∞ | d10= | 0.210 | n5 | 1.517 | ν 5 | 64.2 |
| R10 | ∞ | d11= | 0.302 | | | | |

TABLE 2

| | conical coefficient | aspheric coefficient | | | | | | |
|---|---|---|---|---|---|---|---|---|
| | k | A4 | A6 | A8 | A10 | A12 | A14 | A16 |
| R1 | −1.63E+01 | 1.26E+00 | −4.89E+00 | 1.83E+01 | −6.40E+01 | 1.69E+02 | −2.94E+02 | 2.17E+02 |
| R2 | −5.13E+01 | −2.60E−02 | −1.21E+00 | −4.60E+00 | 1.30E+02 | −8.79E+02 | 2.21E+03 | −1.66E+03 |
| R3 | 4.56E+01 | −7.87E−01 | −4.06E+00 | 3.13E+01 | −1.88E+02 | 5.02E+02 | −5.06E+02 | 2.09E+01 |
| R4 | 9.76E+01 | 3.66E−01 | −7.71E+00 | 3.96E+01 | −1.26E+02 | 2.40E+02 | −2.52E+02 | 1.12E+02 |
| R5 | −5.58E+00 | 1.34E+00 | −9.88E+00 | 3.97E+01 | −9.09E+01 | 1.25E+02 | −9.50E+01 | 3.06E+01 |
| R6 | −7.87E−01 | 6.66E−01 | −2.80E+00 | 1.06E+01 | −2.93E+01 | 5.28E+01 | −4.69E+01 | 1.56E+01 |
| R7 | −3.22E+00 | −1.22E+00 | 1.60E+00 | −9.40E−01 | −8.13E−02 | 3.83E−01 | −1.58E−01 | 1.79E−02 |
| R8 | −3.23E+00 | −7.25E−01 | 1.12E+00 | −1.17E+00 | 7.88E−01 | −3.34E−01 | 7.95E−02 | −8.01E−03 |

TABLE 4

| | conical coefficient | aspheric coefficient | | | | | | |
|---|---|---|---|---|---|---|---|---|
| | k | A4 | A6 | A8 | A10 | A12 | A14 | A16 |
| R1 | −1.63E+01 | 1.26E+00 | −4.87E+00 | 1.84E+01 | −6.40E+01 | 1.69E+02 | −2.93E+02 | 2.17E+02 |
| R2 | −5.06E+01 | −2.24E−02 | −1.21E+00 | −4.65E+00 | 1.30E+02 | −8.79E+02 | 2.21E+03 | −1.61E+03 |
| R3 | 4.56E+01 | −7.87E−01 | −4.04E+00 | 3.14E+01 | −1.88E+02 | 5.02E+02 | −5.04E+02 | 3.35E+01 |
| R4 | 8.22E+01 | 3.66E−01 | −7.71E+00 | 3.96E+01 | −1.26E+02 | 2.40E+02 | −2.52E+02 | 1.12E+02 |
| R5 | −5.65E+00 | 1.34E+00 | −9.88E+00 | 3.97E+01 | −9.09E+01 | 1.25E+02 | −9.50E+01 | 3.07E+01 |
| R6 | −7.88E−01 | 6.66E−01 | −2.80E+00 | 1.06E+01 | −2.93E+01 | 5.28E+01 | −4.69E+01 | 1.56E+01 |
| R7 | −3.21E+00 | −1.22E+00 | 1.60E+00 | −9.40E−01 | −8.12E−02 | 3.83E−01 | −1.58E−01 | 1.80E−02 |
| R8 | −3.23E+00 | −7.25E−01 | 1.12E+00 | −1.17E+00 | 7.88E−01 | −3.34E−01 | 7.95E−02 | −8.01E−03 |

The Embodiment 2 satisfies the conditions (1)-(5), as shown in Table 5.

Figure 7:
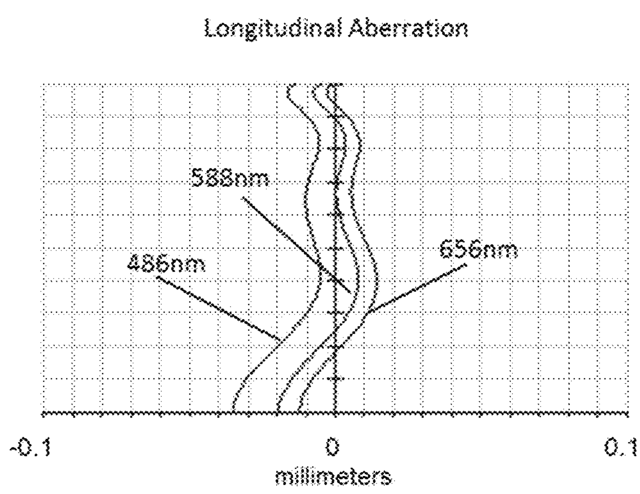
FIG. 7 is a Longitudinal Aberration diagram of the camera lens LA in the Embodiment 2.
Figure 8:
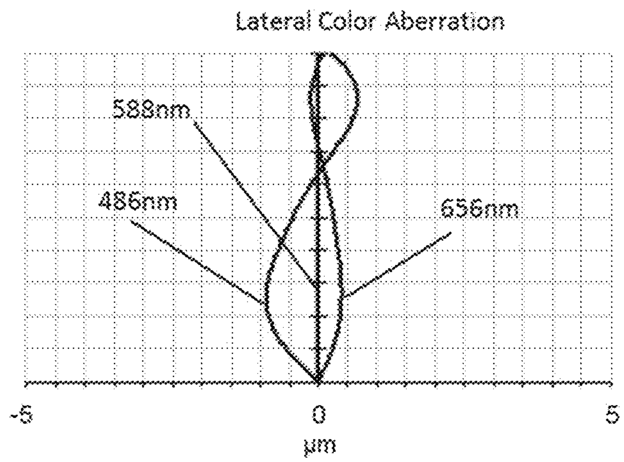
FIG. 8 is the Lateral Color Aberration diagram of the camera lens LA in the Embodiment 2.
Figure 9:
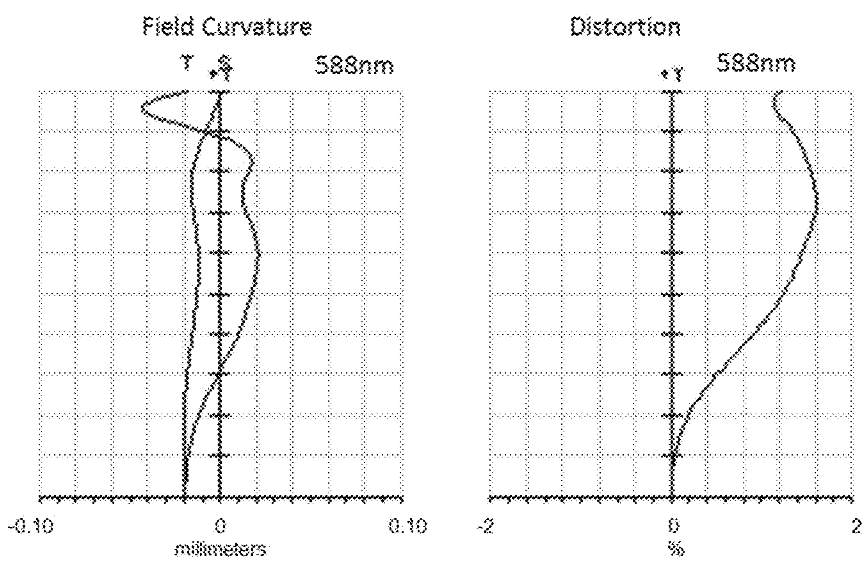
FIG. 9 is a Field Curvature Distortion of the camera lens LA in the Embodiment 2.

See FIG. 7 for Longitudinal Aberration of the camera lens LA in the Embodiment 2, see FIG. 8 for Lateral Color Aberration of it, and see FIG. 9 for curvature of field and distortion of it. Moreover, the total angle of view is involved in the camera lens LA in the Embodiment 2 as shown in FIGS. 7-9, and the lens refers to the small sized wide angle camera lens having high luminous flux, wherein 2ω=83.5°, TTL/IH=2.952, Fno=1.96; therefore, it is no wonder that this lens has these excellent optical properties.

The values in all embodiments and the values corresponding to the parameters specified in the conditions (1)-(5) are shown in the Table 5. Moreover, the units including 2ω(°), f (mm), f1 (mm), f2 (mm), f3 (mm), f4 (mm), TTL (mm), LB (mm) and IH (mm) are shown in the Table 5, respectively.

TABLE 5

| | Embodiment 1 | Embodiment 2 | Condition |
|---|---|---|---|
| f1/f | 1.340 | 1.327 | 1 |
| f4/f | −1.050 | −1.050 | 2 |
| (R1 + R2)/(R1 − R2) | −1.658 | −1.655 | 3 |
| f2/f | −2.948 | −2.925 | 4 |
| f3/f | 0.690 | 0.692 | 5 |
| Fno | 1.94 | 1.96 | |
| 2 ω | 83.5 | 83.5 | |
| f | 1.990 | 1.990 | |
| f1 | 2.666 | 2.640 | |
| f2 | −5.867 | −5.820 | |
| f3 | 1.374 | 1.377 | |
| f4 | −2.090 | −2.089 | |
| TTL | 2.956 | 2.952 | |
| LB | 1.017 | 1.012 | |
| IH | 1.814 | 1.814 | |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera lens consisting of, in an order from an object side to an image side:

a first lens with positive refractive power;

a second lens with negative refractive power;

a third lens with positive refractive power;

a fourth lens with negative refractive power; wherein the camera lens satisfies following conditions (1-A)~(3-A), and (5-A):

$$1.30 \le f1/f \le 1.40 \quad (1\text{-A});$$

$$-2.00 \le f4/f \le -0.90 \quad (2);$$

$$-2.00 \le (R1+R2)/(R1-R2) \le -1.50 \quad (3\text{-A});$$

$$0.65 \le f3/f \le 0.75 \quad (5\text{-A});$$

where, f: overall focal distance of the camera lens;

f1: focal distance of the first lens;

f3: focal distance of the third lens;

f4: focal distance of the fourth lens;

R1: curvature radius of the first lens' object side surface;

R2: curvature radius of the first lens' image side surface.

2. The camera lens as described in claim 1 further satisfying the following condition (4):

$$-4.00 \le f2/f \le -2.00 \quad (4);$$

where, f: overall focal distance of the camera lens;

f2: focal distance of the second lens.

3. The camera lens as described in claim 1 further satisfying following condition (2-A):

$$-1.30 \le f4/f \le -1.00 \quad (2\text{-A}).$$

4. The camera lens as described in claim 2 further satisfying following condition (4-A):

$$-3.20 \le f2/f \le -2.50 \quad (4\text{-A}).$$

* * * * *